(12) United States Patent
Koike

(10) Patent No.: US 7,222,398 B2
(45) Date of Patent: May 29, 2007

(54) CLIP

(75) Inventor: Takashi Koike, Kanagawa (JP)

(73) Assignee: Piolax Inc., Yokohama-Shi, Kanagawa-ken (JP)

( * ) Notice: Subject to any disclaimer, the term of this patent is extended or adjusted under 35 U.S.C. 154(b) by 111 days.

(21) Appl. No.: 10/947,403

(22) Filed: Sep. 23, 2004

(65) Prior Publication Data

US 2005/0091802 A1 May 5, 2005

(30) Foreign Application Priority Data

Sep. 24, 2003 (JP) ............................ P.2003-331062

(51) Int. Cl.
*F16B 13/06* (2006.01)

(52) U.S. Cl. ..................... 24/297; 24/453; 411/48

(58) Field of Classification Search .......... 24/289–297, 24/453, 606, 607; 411/41, 45–48, 340, 344, 411/453, 908, 508–510
See application file for complete search history.

(56) References Cited

U.S. PATENT DOCUMENTS

| 4,311,421 | A | * | 1/1982 | Okada et al. ................. | 411/59 |
| 4,610,587 | A | * | 9/1986 | Wollar et al. ................. | 411/80.1 |
| 4,840,522 | A | * | 6/1989 | Kurihara ........................ | 411/44 |
| 4,878,791 | A | * | 11/1989 | Kurihara et al. .............. | 411/55 |
| 4,883,382 | A | * | 11/1989 | Mushya ......................... | 411/182 |
| 5,030,051 | A | * | 7/1991 | Kaneko et al. ............... | 411/55 |
| D326,049 | S | * | 5/1992 | Kurihara et al. ............. | D8/385 |
| 5,375,954 | A | * | 12/1994 | Eguchi .......................... | 411/48 |
| 6,481,942 | B2 | * | 11/2002 | Tanaka ......................... | 411/45 |
| 6,932,552 | B2 | * | 8/2005 | Anscher et al. ............... | 411/41 |
| 2001/0022923 | A1 | * | 9/2001 | Arisaka ........................ | 411/45 |

FOREIGN PATENT DOCUMENTS

| GB | 2287746 A | 9/1995 |
| JP | 11-270525 | 10/1999 |
| WO | WO 98/15745 | 4/1998 |

OTHER PUBLICATIONS

French Search Report dated Jul. 17, 2006.

* cited by examiner

*Primary Examiner*—Robert J. Sandy
*Assistant Examiner*—Ruth C. Rodriguez
(74) *Attorney, Agent, or Firm*—McGinn IP Law Group, PLLC (57) ABSTRACT

A clip includes: a pin having a head and a shank; and a grommet having a collar and a leg. The leg of the grommet is divided into a plurality of expansion leg pieces by means of slits extending along an axial direction. The expansion leg pieces of the leg are expanded outwardly by the insertion of the pin into an inner side of the grommet, so as to clamp plate-like members by the collar and the expansion leg pieces. The leg of the grommet has resilient beams which project outwardly of the expansion leg pieces on a collar side when the pin is inserted into the inner side of the grommet.

20 Claims, 8 Drawing Sheets

CLIP

BACKGROUND OF THE INVENTION

1. Field of the Invention

The present invention relates to a two-piece type clip for fixing a plate-like member, such as an interior or exterior part of an automobile, to a vehicle body panel, for example.

2. Description of the Related Art

Each conventional clip of this type, although not specifically shown, is comprised of two parts including a pin and a grommet, which are integrally molded from a synthetic resin. The former pin has a head and a shank, while the latter grommet has a collar and a leg, the leg being divided into a plurality of expansion leg pieces by means of slits extending along an axial direction (refer to, for example, JP-A-11-270525).

When a plate-like member of an automobile is actually fixed to a body panel, the shank of the pin is first inserted into inner sides of the expansion leg pieces through an opening formed in the collar of the grommet, thereby obtaining a state in which the two members are temporarily retained. In this state, the leg of the grommet is pushed into attaching holes bored in advance in the plate-like member and the body panel, so as to completely push the pin shaft into the inner sides of the expansion leg pieces. Then, the expansion leg pieces of the grommet expand outwardly. Consequently, the plate-like member and the body panel are clamped from inner and outer sides by the collar of the grommet and the expansion leg pieces, thereby fixing the plate-like member to the body panel side in a superposed state.

Accordingly, with the conventional clip, the divided expansion leg pieces of the leg are forcibly expanded outwardly by the insertion of the pin into the inner side of the grommet, so as to fix the plate-like member to the body panel in a superposed state. At this time, in a case where the total plate thickness of the plate-like member and the body panel is large, not much problem is encountered in the fixation since the dip portion side of each expansion leg piece is capable of expanding sufficiently in terms of its structure. However, in a case where the total plate thickness of the plate-like member and the body panel is conversely small, the expanding force naturally becomes insufficient in the light of the fact that the expansion leg pieces must expand on the root side of the collar. Therefore, in the event that a large external force is applied or the effect of vibrations persists for a long time after the fixation of the plate-like member, there has been a possibility that the plate-like member rattles unexpectedly, or unpleasant noise occurs due to the rattling. It should be noted that, in the conventional clip, a construction is adopted in which expanding points of the expansion leg pieces are made different in the axial direction, with this measure alone it has not been impossible to expect a sufficient effect.

SUMMARY OF THE INVENTION

The invention has been developed to effectively overcome the above-described problems of the conventional clip, and in accordance with a first aspect of the invention there is provided a clip comprising: a pin having a head and a shank; and a grommet having a collar and a leg; the leg of the grommet being divided into a plurality of expansion leg pieces by means of slits extending along an axial direction, the expansion leg pieces of the leg being expanded outwardly by the insertion of the pin into an inner side of the grommet, so as to clamp two or more plate-like members by the collar and the expansion leg pieces, wherein the leg of the grommet has resilient beams which project outwardly of the expansion leg pieces on a collar side when the pin is inserted into the inner side of the grommet.

In the invention according to a second aspect, on the basis of the first aspect, the resilient beams are respectively disposed in the slits, and one ends thereof are respectively connected to a lower surface of the collar, while other ends thereof are integrally connected.

In the invention according to a third aspect, on the basis of the second aspect, the other ends of the resilient beams project outwardly from a tip edge of the leg in a tapered state.

In the invention according to a fourth aspect, on the basis of the second or third aspect, each of the resilient beams has a jutting out shoulder on an outer surface thereof at a position close to one end thereof.

In the invention according to a fifth aspect, on the basis of the fourth aspect, the resilient beams are provided in even pairs, and the jutting out shoulders of the respective pairs are formed at vertically different positions.

In the invention according to a sixth aspect, on the basis of any one of the first to fifth aspects, the pin has accommodating grooves for accommodating the resilient beams.

In the invention according to a seventh aspect, on the basis of any one of the second to sixth aspects, the collar of the grommet has open ports on outer sides of one ends of the resilient beams.

Therefore, in the invention according to the first aspect, in the case where the total plate thickness of the plate-like members which are fixed is large, the plate-like members are reliably clamped by portions of the collar of the grommet and the fully expanded expansion leg pieces. On the other hand, in the case where the total plate thickness of the plate-like members which are fixed is small, the plate-like members are reliably clamped by the collar of the grommet and the resilient beams which project outwardly of the expansion leg pieces on the collar side. In either case, therefore, it becomes possible to firmly fix the plate-like members without rattling.

In the invention according to the second aspect, since the resilient beam has one ends connected to the collar and the other ends integrally connected to each other, it becomes possible for the resilient beams to easily deflect in the slits. In the invention according to the third aspect, since the other ends of the resilient beams project outwardly in a tapered shape, the operation of pushing of the plate-like member into the attaching hole can be effected smoother. In consequence, since the size of the resilient beams becomes long, the resilient beams are made further deflectable. In the invention according to the fourth aspect, since the jutting out shoulders of the resilient beams are actively involved in the fixation of the plate-like members, the state of fixation of the plate-like members is made firmer.

In the invention according to the fifth aspect, since the pairs of jutting out shoulders are formed at vertically different positions, it becomes correspondingly possible to cope with a number of kinds of thin plates. In the invention according to the sixth aspect, since the pin has accommodating grooves or accommodating the resilient beams, particularly in the case where a thick plate is made an object, the resilient beams themselves which project outwardly of the expansion leg pieces, or their jutting out shoulders, do not constitute hindrances. In the invention according to the seventh aspect, since the collar has open ports on the outer sides of the one ends of the resilient beams, the deflection of the one end side of the resilient beams is facilitated. In particular, in cases where jutting out shoulders are molded on the outer surfaces of the resilient beams, it becomes possible to utilize these open ports as mold insertion ports.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

In the invention, in a two-piece type clip comprised of a pin and a grommet, particularly even in a case where the total plate thickness of plate-like members which are fixed is small, the plate-like members can be reliably fixed without rattling by making improvements on the grommet side.

Figure 1:
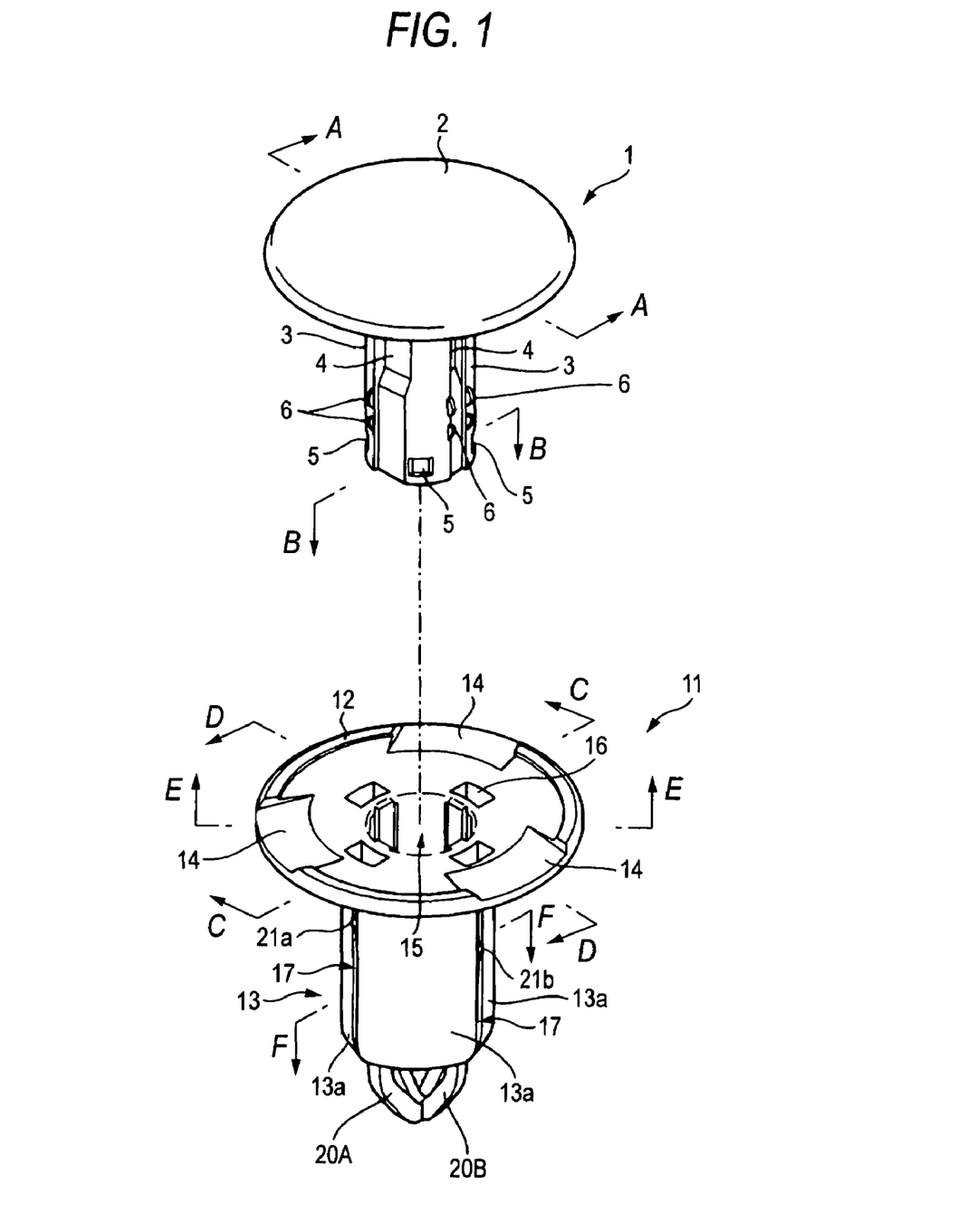
FIG. 1 is an exploded perspective view of a clip in accordance with an embodiment of the invention.
Figure 2A:
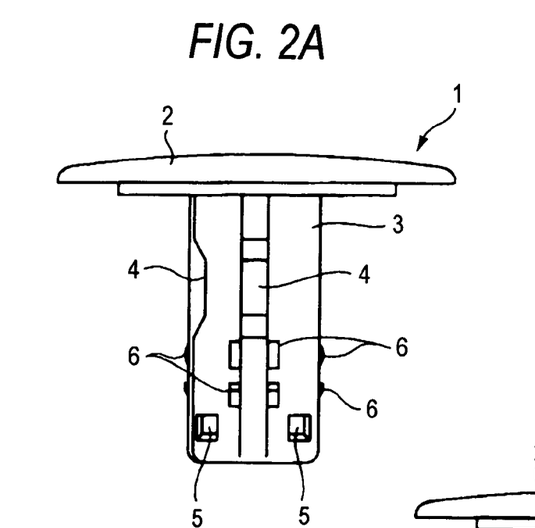
FIG. 2A is a front elevational view of a pin.
Figure 2B:
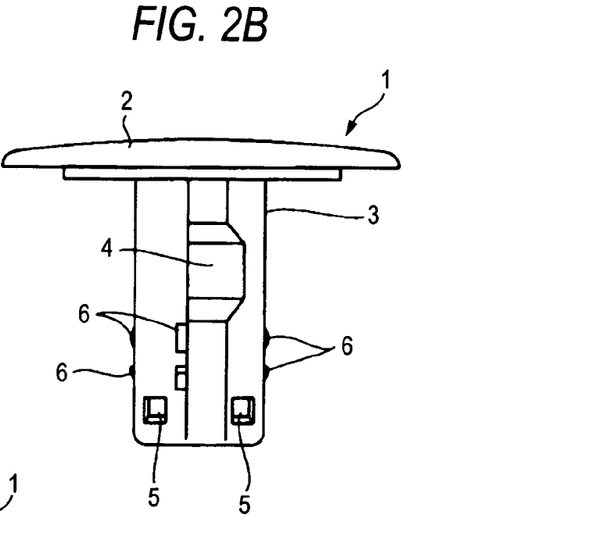
FIG. 2B is a side elevational view thereof.
Figure 2C:
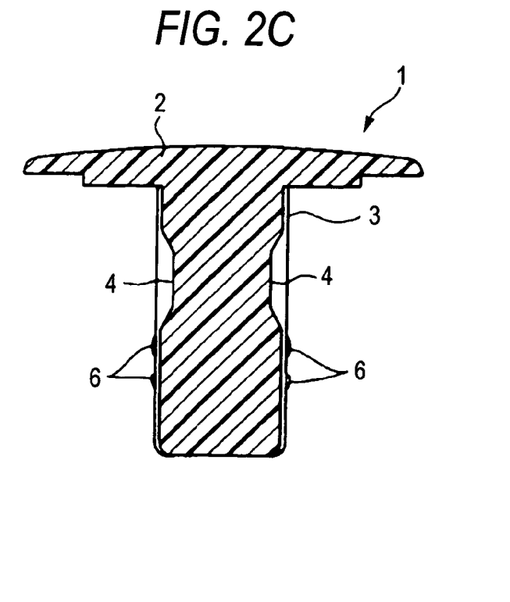
FIG. 2C is a cross-sectional view taken along line A—A in FIG. 1.
Figure 2D:
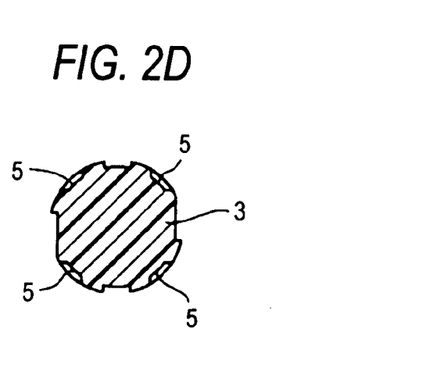
FIG. 2D is a cross-sectional view taken along line B—B in FIG. 1.
Figure 3A:
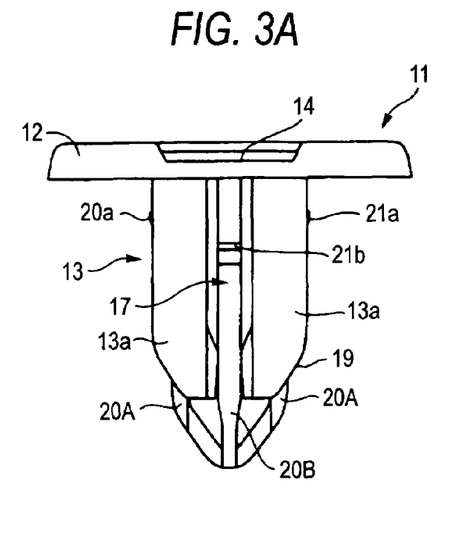
FIG. 3A is a front elevational view of a grommet.
Figure 3B:
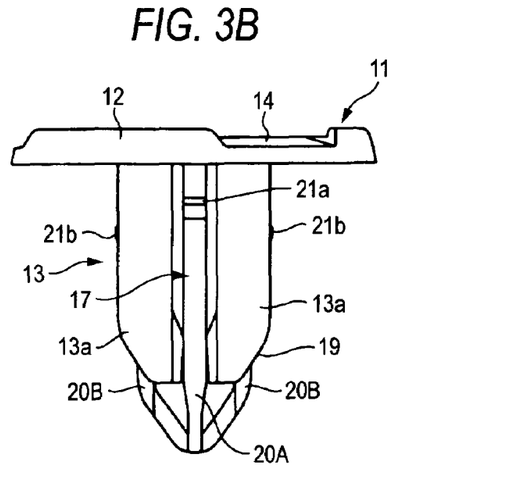
FIG. 3B is a side elevational view thereof.
Figure 3C:
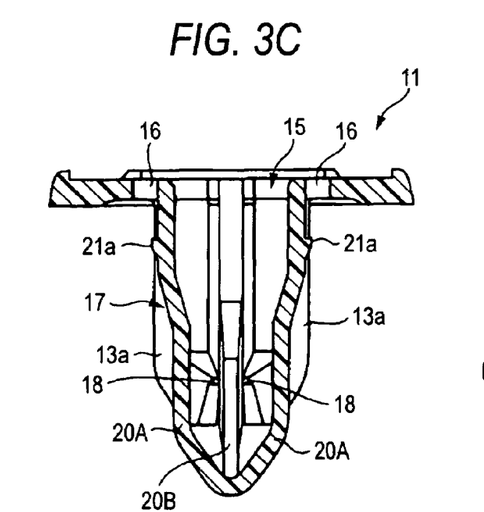
FIG. 3C is a cross-sectional view taken along line C—C in FIG. 1.
Figure 3D:
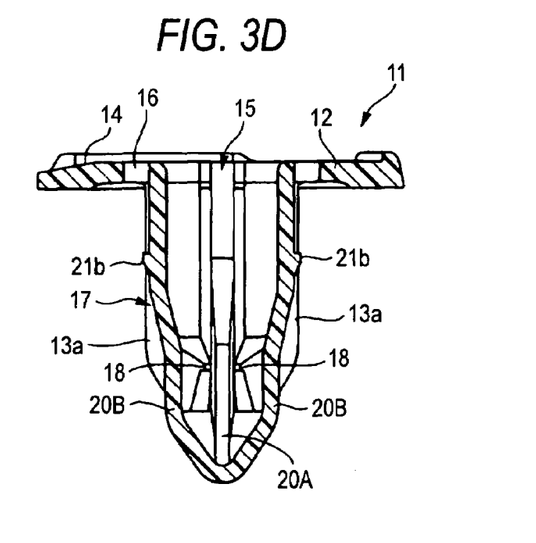
FIG. 3D is a cross-sectional view taken along line D—D in FIG. 1.
Figure 4A:
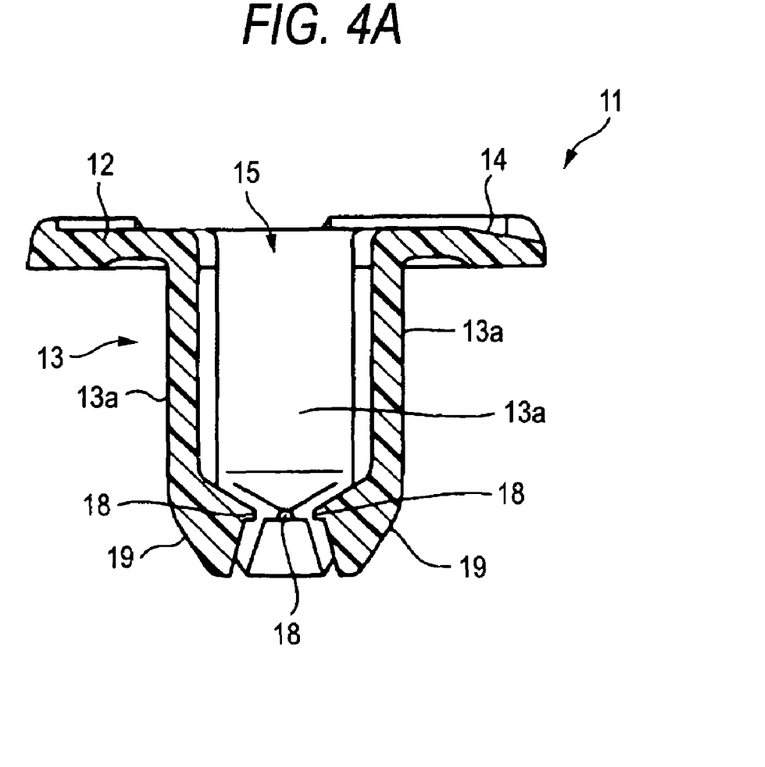
FIG. 4A is a cross-sectional view taken along line E—E in FIG. 1.
Figure 4B:
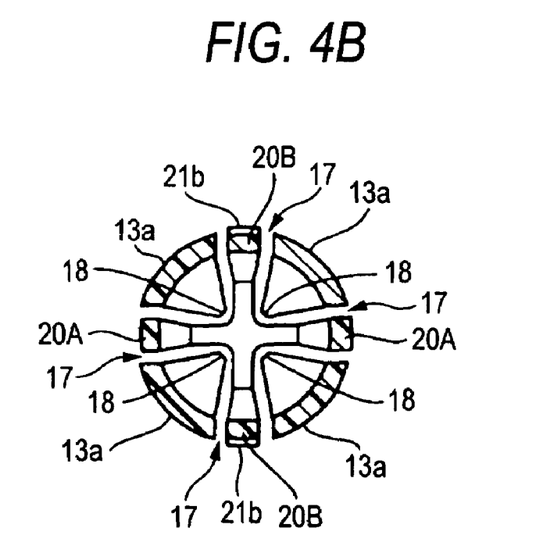
FIG. 4B is a cross-sectional view taken along line F—F in FIG. 1.

Hereafter, a detailed description will be given of a preferred embodiment of the invention illustrated in the drawings. As shown in FIG. 1, the clip in accordance with this embodiment is comprised of two parts including a pin 1 and a grommet 11, which are integrally molded from a synthetic resin, and is used for fixing a plate-like member, such as an interior or exterior part of an automobile, to a vehicle body panel.

To give a specific description, the first-mentioned pin 1 has a disk-shaped head 2 and a cylindrical shank 3 suspended from a lower surface of the head 2. In particular, as also shown in FIGS. 2A to 2D, four accommodating grooves 4 for accommodating resilient beams 20A and 20B of the grommet 11, which will be described later, are formed in outer surfaces of the shank 3 which are opposed to each other at intervals of 90. at positions slightly closer to the head 2. Four recesses 5 for retaining inwardly oriented projections 18 of the grommet 11, which will be described later, are formed in the outer surfaces of the shank 3 at positions close to a tip of the shank 3 and where the accommodating grooves 4 are not formed. Further, six pairs of temporarily retaining pawls 6 for retaining from inner and outer sides an edge of an opening 15 of the grommet 11, which will be described later, are formed in the opposing outer surfaces where the intermediate accommodating grooves 4 are formed.

In addition, as also shown in FIGS. 3A to 3D and FIGS. 4A and 4B, the latter-mentioned grommet 11 has a disk-shaped collar 12 and a cylindrical leg 13 suspended from a lower surface of the collar 12. As for the collar 11, three U-grooves 14 are formed in an outer peripheral edge of its upper surface to define an insertion space for inserting a tip of a slotted screwdriver in cooperation with the head 2 of the above-described pin 1. The opening 15 communicating with an inner side of the leg 13 is formed in a central portion of the collar 12, and four open ports 16 are formed midway between the opening 15 and the U-grooves 14. The arrangement provided is such that by using the respective open ports 16 as mold insertion holes, jutting out shoulders 21a and 21b of the resilient beams 20A and 20B, which will be described later, can be formed.

The leg 13 is equally divided into four expansion leg pieces 13a by means of slits 17 extending along its axial direction. Inwardly oriented projections 18 adapted to be retained in the recesses 5 of the above-described pin 1 are respectively formed on inner surfaces of the expansion leg pieces 13a at positions close to tips thereof. Outer surfaces of the expansion leg pieces 13a are provided with tapered shapes 19. Meanwhile, the resilient beams 20A and 20B, which are formed in two U-shaped pairs, are respectively disposed inside the slits 17. One ends of the resilient beams 20A and 20B are respectively connected to a lower surface of the aforementioned collar 12 on inward sides of the open ports 16, while the other ends thereof are integrally connected and project outwardly from a tip edge of the leg 13 in a tapered state. The arrangement provided is such that jutting out shoulders 21a and 21b for being retained at an edge of an attaching hole H2 in a vehicle body panel P2, which will be described later, are respectively formed in an opposing manner on outer surfaces of the U-shaped pairs of the resilient beams 20A and 20B at positions close to the one ends thereof.

It should be noted that the pairs of jutting out shoulders 21a and 21b act particularly in cases where the total plate thickness of the plate-like member and the body panel is small. Even in a molded state, the jutting out shoulders 21a and 21b slightly project outwardly of the expansion leg pieces 13a on the collar 12 side. However, if the shank 3 of the pin 1 is completely inserted into the inner side of the leg 13 of the grommet 11, the resilient beams 20A and 20B themselves are deformed and expand, so that the jutting out shoulders 21a and 21b project further outwardly. In addition, the respective pairs of jutting out shoulders 21a and 21b are formed at vertically different positions. In this embodiment, the upper-stage jutting out shoulders 21a are set to be capable of coping with a case where the total plate thickness of the plate-like member and the body panel is 1.5 mm. Meanwhile, the lower-stage jutting out shoulders 21b are set to be capable of coping with a case where the total plate thickness of the plate-like member and the body panel is 3 mm. In implementing the invention, however, the invention is not limited to these settings.

Figure 5:
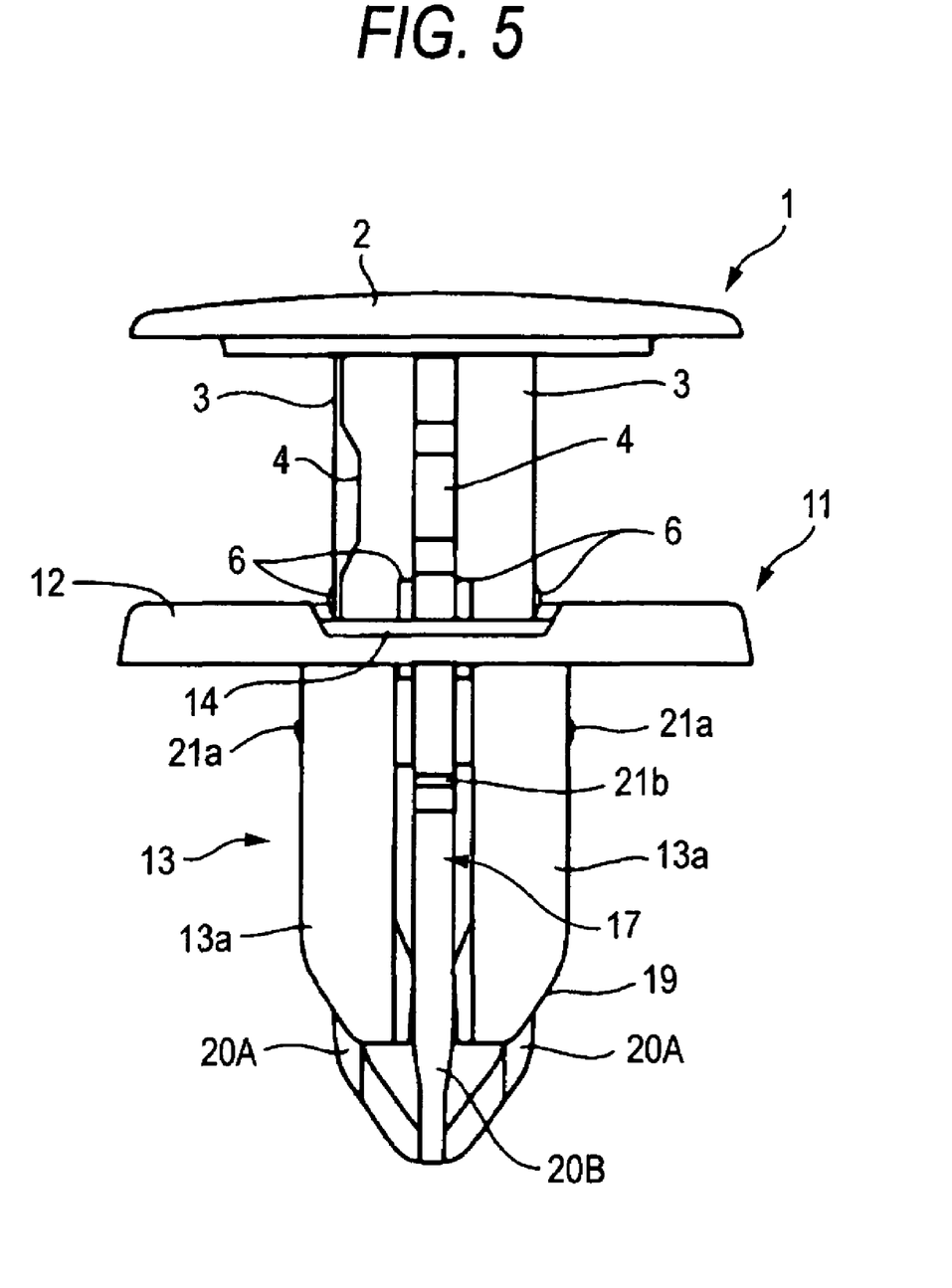
FIG. 5 is a front elevational view illustrating a state of temporary retention of the pin and the grommet.

Accordingly, in a case where a plate-like member P1 of an automobile is fixed to the body panel P2 by using the pin 1 and the grommet 11 constructed as described above, in either case, the shank 3 of the pin 1 is first inserted into the inner sides of the expansion leg pieces 13a through the opening 15 formed in the collar 12 of the grommet 11. Thus, a state of retention of the temporarily retaining pawls 6 of the shank 3 is obtained with respect to the edge of the opening 15. After both members 1 and 11 have been temporarily retained, as shown in FIG. 5, if it is now assumed that the total plate thickness of 1.5 mm is the case using a so-called sheet, the attaching holes H1 and H2 bored in advance in the plate-like member P1 and the body panel P2 are aligned with each other, and the leg 13 of the grommet 11 in a temporarily retained state is pushed into the attaching holes H1 and H2. In this pushing-in operation, however, since the other ends of the resilient beams 20A and 20B project outwardly in a tapered state from the tip edge of the leg 13, the leg 13 of the grommet 11 can be smoothly pushed into the attaching holes H1 and H2, coupled with the tapered shapes 19 of the aforementioned expansion leg pieces 13a. Hence, the operation becomes extremely easy. In addition, at the time the leg 13 of the grommet 11 is pushed into the attaching holes H1 and H2, the jutting out shoulders 21a and 21b projecting slightly outwardly of the expansion leg pieces 13a, while being accompanied by the resilient beams 20A and 20B, are deflected inwardly by making use of the accommodating grooves 4 on the pin 1 side. Therefore, the presence of the jutting out shoulders 21a and 21b does not become a hindrance. It should be noted that, as for the resilient beams 20A and 20B, their size can be made relatively long, and they themselves are easily deflectable and promotes the inward deflection of the jutting out shoulders 21a and 21b.

Figure 6:
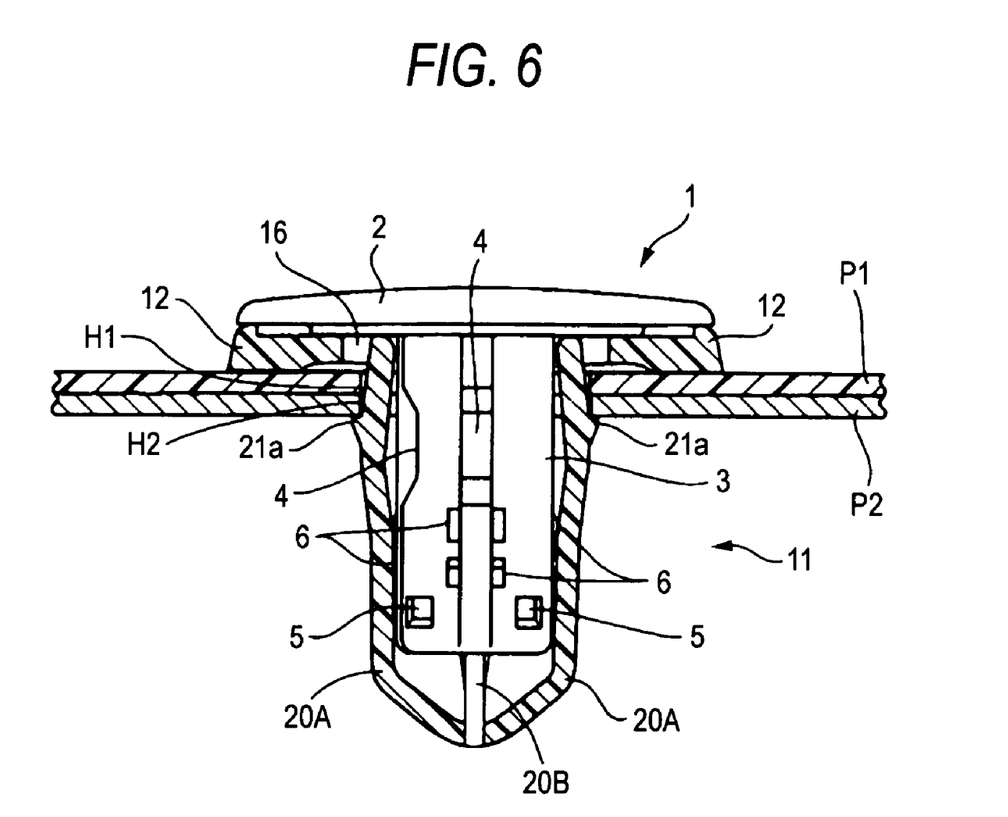
FIG. 6 is a cross-sectional view illustrating a state in which a plate-like member and a body panel having a total plate thickness of 1.5 mm, i.e., the thickness of a so-called thin plate, are fixed together.

Accordingly, after the leg 13 of the grommet 11 is pushed into the attaching holes H1 and H2, the shank 3 of the pin 1 is completely pushed into the inner sides of the expansion leg pieces 13a until the head 2 abuts against the collar 12. Then, although not shown, the inwardly oriented projections 18 of the respective expansion leg pieces 13a are retained in the corresponding recesses 5 on the pin 1 side, and the expansion leg pieces 13a expand outwardly. At the same time, as shown in FIG. 6, the tip of the leg 13 of the pin 1 abuts against the inner surfaces of the resilient beams 20A and 20B and causes the resilient beams 20A and 20B to expand outwardly. Therefore, in conjunction with this expansion, the upper- and lower-stage jutting out shoulders 21a and 21b project further outwardly. Particularly in this case, the upper-stage jutting out shoulders 21a are retained at the edge of the attaching hole H2 of the body panel P2, and the plate-like member P1 and the body panel P2 are clamped from inner and outer sides by the collar 12 of the grommet 11 and the jutting out shoulders 21a of one pair of resilient beams 20A. As a result, the body panel P2 and the plate-like member P1 having a total plate thickness of 1.5 mm, i.e., the thickness of a so-called thin plate, are reliably fixed together. Incidentally, in this case, the outwardly expanded expansion leg pieces 13a are also involved in the fixation to some degree. In this embodiment, however, even if the expansion force of the expansion leg pieces 13a was insufficient as in a conventional case, the jutting out shoulders 21a formed on the outer surfaces of the one pair of resilient beams 20A are mainly involved. Hence, the state of fixation becomes positive and firm, so that the possibility of the plate-like member P1 unexpectedly rattling is totally eliminated.

Figure 7:
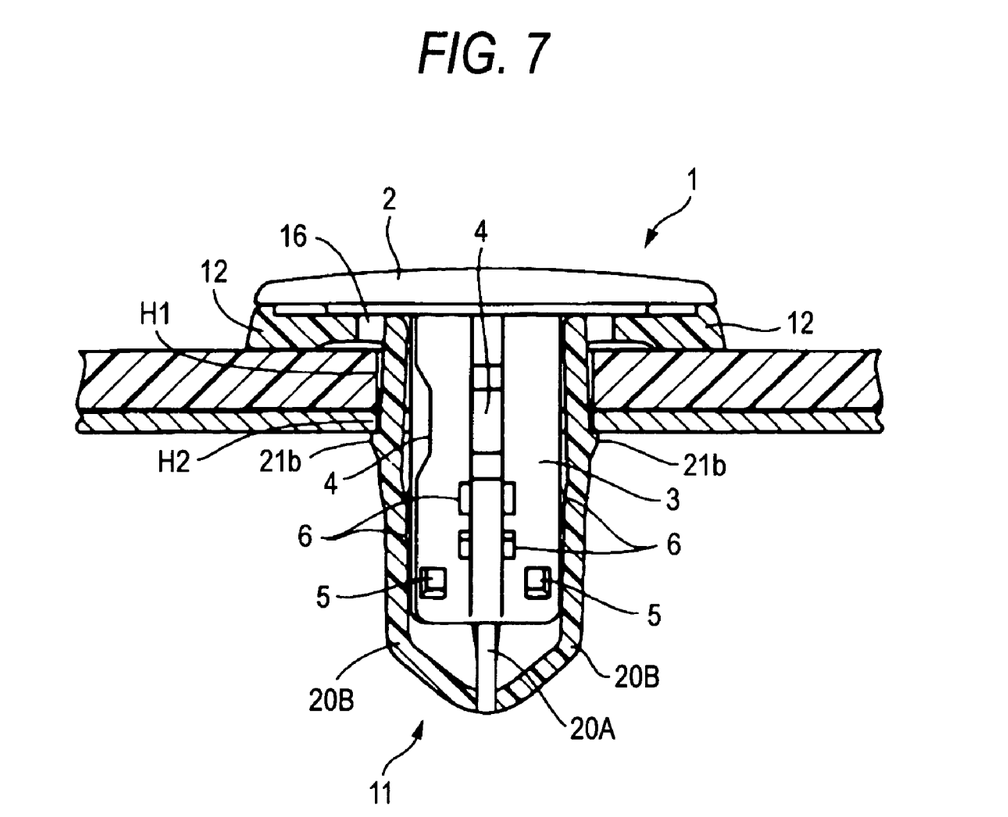
FIG. 7 is a cross-sectional view illustrating a state in which the plate-like member and the body panel having a total plate thickness of 3 mm, i.e., the thickness of a so-called thin plate, are fixed together.

In addition, in the case where 3 mm in the total plate thickness, i.e., the thickness of a so-called thin plate, is an object, the plate-like member P1 can be fixed to the body panel P2 in an operation similar to the one described above. However, the difference lies in that the other resilient beams 20B with the lower-stage jutting out shoulders 21b formed thereon correspond, and the jutting out shoulders 21b are retained at the edge of the attaching hole H2 of the body panel P2. Therefore, the plate-like member P1 and the body panel P2 having a total plate thickness of 3 mm, i.e., the thickness of a so-called thin plate, are reliably fixed together. In this case, it should be noted that the one pair of resilient beams 20A with the upper-stage jutting out shoulders 21a formed thereon are deflected in the corresponding accommodating grooves 4 of the pin 1 together with the jutting out shoulders 21a. At this time, since the open ports 16 are formed on the outer sides of one ends of these resilient beams 20A, the resilient beams 20A are easily deflected and have no risk of being cut off. Both resilient beams 20A and 20B themselves as a whole can be easily deflected since their size can be made relatively long.

Figure 8:
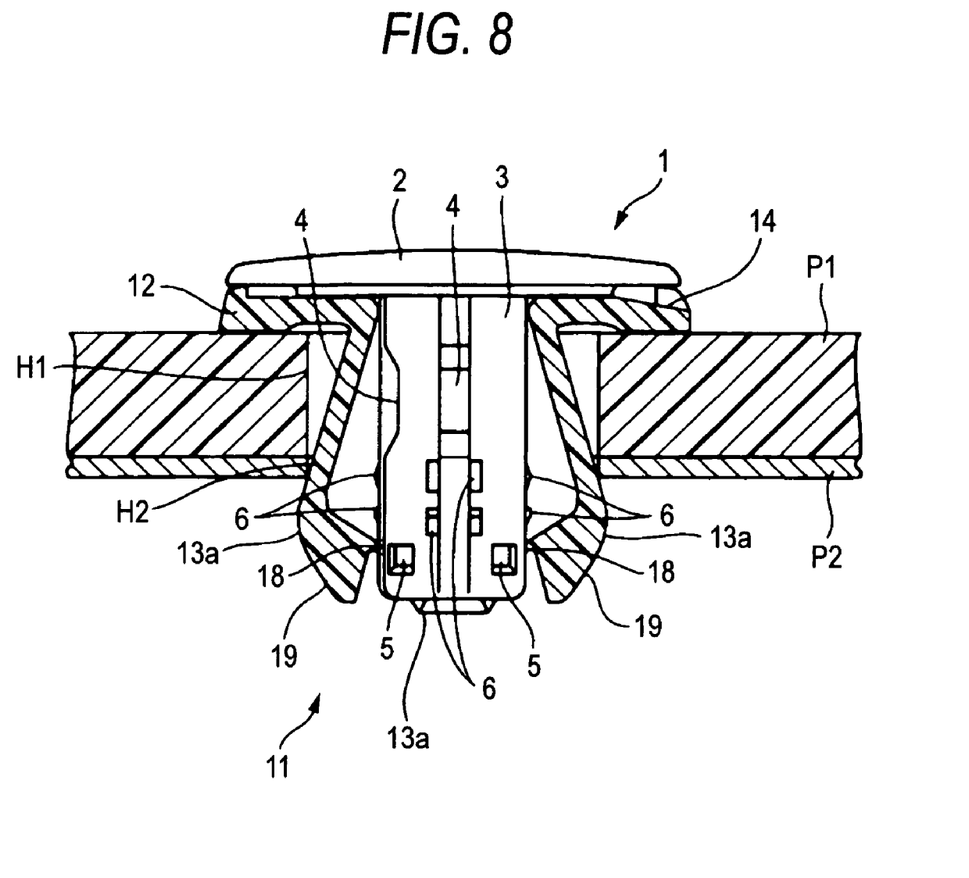
FIG. 8 is a cross-sectional view illustrating a state in which the plate-like member and the body panel having a total plate thickness of 6 mm, i.e., the thickness of a so-called thick plate, are fixed together.

Next, in a case where 6 mm in the total plate thickness, i.e., the thickness of a so-called thick plate, is an object, unlike the case where the thin plate is the object, this time, as shown in FIG. 8, the plate-like member P1 and the body panel P2 having a total plate thickness of 6 mm, i.e., the thickness of a so-called thick plate, are reliably fixed together by only the outward expansion of the expansion leg pieces 13a as in the conventional manner without being subjected to the action of the jutting out shoulders 21a and 21b of the resilient beams 20A and 20B. Therefore, in the clip in accordance with this embodiment, in either case, both the thin plate and the thick plate can be firmly fixed without rattling. Particularly in the case where the thick plate is the object, the respective resilient beams 20A and 20B press the inner peripheral surfaces of the attaching holes H1 and H2, so that a firmly fixed state can be ensured in this respect as well.

It should be noted that in cases where the thin plate and the thick plate are objects, when it is necessary to cancel this state of fixation, a tip of a slotted screwdriver is inserted in the insertion space defined between the head 2 of the pin and the collar 12 of the grommet 11, and the shank 3 of the pin 1 is forcibly pulled off from inside the grommet 11. This cancels the state of fixation. Further, in this embodiment, in the case where the total plate thickness is 3 mm or less, the clip itself in a temporarily retained state can be temporarily held with respect to the attaching holes H1 and H2 of the plate-like member P1 and the body panel P2.

The clip in accordance with the invention is capable of reliably fixing together the plate-like member P1 and the body panel P2 which have the thickness of a so-called thin plate, in addition to the plate-like member P1 and the body panel P2 which have the thickness of a so-called thick plate. Therefore, the clip in accordance with the invention is extremely convenient when fixing interior or exterior parts of an automobile or the like to a predetermined panel.

What is claimed is:
1. A clip comprising:
a pin comprising a head and a shank; and
a grommet comprising a collar and a leg, wherein:
the leg of the grommet is divided into a plurality of expansion pieces by slits extending along an axial direction;
the expansion pieces of the leg are expanded outwardly by the insertion of the pin into an inner side of the grommet, so as to clamp two or more plate-like members by the collar and the expansion pieces; and the leg of the grommet comprises resilient beams respectively disposed in the slits and which project outwardly of the expansion pieces on a collar side when the pin is inserted into the inner side of the grommet.

2. The clip according to claim 1, wherein the resilient beams comprise ends thereof respectively connected to a lower surface of the collar, and other ends thereof which are integrally connected.

3. The clip according to claim 2, wherein the other ends of the resilient beams project outwardly from a tip edge of the leg in a tapered state.

4. The clip according to claim 2, wherein the resilient beams comprise a jutting out shoulder on an outer surface thereof at a position close to the one ends thereof.

5. The clip according to claim 4, wherein the resilient beams are provided in even pairs, and the jutting out shoulders of the respective pairs are formed at vertically different positions.

6. The clip according to claim 1, wherein the pin comprises accommodating grooves for accommodating the resilient beams.

7. The clip according to claim 2, wherein the collar of the grommet comprises open ports on outer sides of the one ends of the resilient beams.

8. A clip comprising:
a pin having a head and a shank; and
a grommet having a collar and a leg extending axially from the collar, wherein:
the leg of the grommet is divided into a plurality of expansion pieces by slits extending along the axial direction;
the expansion pieces are arranged and configured so as to be urged radially outwardly by axial insertion of the pin through an opening in the collar into an inner side of the grommet, so as to clamp two or more plate-like members by the collar and the expansion pieces; and
the leg of the grommet has resilient beams arranged and configured between expansion pieces to project radially outwardly of the expansion pieces at a collar end when the pin is inserted axially into the inner side of the grommet.

9. The clip according to claim 8, wherein the resilient beams are respectively disposed in the slits, first ends of the resilient beams are respectively connected to the collar, and second ends of the resilient beams are integrally connected.

10. The clip according to claim 9, wherein tapered portions of the second ends of the resilient beams project axially beyond a tip edge of the leg.

11. The clip according to claim 9, wherein the resilient beams comprise a jutting out shoulder on an outer surface thereof at a position close to one end thereof.

12. The clip according to claim 11, wherein the resilient beams are provided in even pairs, and the jutting out shoulders of the respective pairs are formed at axially different positions.

13. The clip according to claim 8, wherein the pin has accommodating grooves for accommodating the resilient beams.

14. The clip according to claim 9, wherein the collar of the grommet has open ports on outer sides of the first ends of the resilient beams.

15. A grommet for a clip, the grommet comprising:
a collar and a leg, wherein:
the leg of the grommet is divided into a plurality of expansion pieces by slits extending along an axial direction;
the expansion pieces of the leg are expanded outwardly by the insertion of a pin into an inner side of the grommet, so as to clamp two or more plate-like members by the collar and the expansion pieces; and
the leg of the grommet comprises resilient beams respectively disposed in the slits and which project outwardly of the expansion pieces on a collar side when the pin is inserted into the inner side of the grommet.

16. The grommet according to claim 15, wherein the resilient beams comprise ends thereof respectively connected to a lower surface of the collar, and other ends thereof which are integrally connected.

17. The grommet according to claim 16, wherein the other ends of the resilient beams project outwardly from a tip edge of the leg in a tapered state.

18. The grommet according to claim 16, wherein the resilient beams comprise a jutting out shoulder on an outer surface thereof at a position close to one ends thereof.

19. The grommet according to claim 18, wherein the resilient beams are provided in even pairs, and the jutting out shoulders of the respective pairs are formed at vertically different positions.

20. The grommet according to claim 15, wherein the collar of the grommet comprises open ports on outer sides of the one ends of the resilient beams.

* * * * *